3,193,373
METHOD AND COMPOSITION FOR INHIBITING TOBACCO SUCKERS
Edwin V. Parups, Ottawa, Ontario, Canada, assignor to Canadian Patents and Development Limited, Ottawa, Ontario, Canada, a company
No Drawing. Filed May 28, 1962, Ser. No. 197,881
11 Claims. (Cl. 71—2.3)

This invention relates to agricultural chemical compositions and in particular to agricultural chemical compositions containing quinone (p-benzoquinone) and ring-substituted quinones which can be used in conjunction with maleic acid hydrazide (1,2-dihydropyridazine-3,6-dione) and derivatives thereof, when used to inhibit the growth of suckers on tobacco plants, to counteract the adverse effects which maleic acid hydrazide and its derivatives have on tobacco leaves when used alone.

The use of maleic acid hydrazide and its derivatives in an agricultural composition capable of being used for inhibiting the growth of suckers on tobacco plants is known as evidenced by United States Patent No. 2,805,926, issued September 10, 1957, to United States Rubber Company. However, the use of such as a sucker growth inhibitor has not met with very widespread acceptance even though the advantages to be gained through its use are, as will be appreciated, quite significant bearing in mind the acreage in North America currently devoted to tobacco growing, because of the fact that the use of maleic acid hydrazide and its derivatives for this purpose has been found to adversely effect the resultant tobacco to the extent that certain characteristics of the tobacco leaf so treated are changed in a manner which is detrimental from the tobacco product manufacturers' point of view even though the tobacco's quality as measured by grades is not normally changed appreciably. Obviously from the tobacco farmers' standpoint this treatment, if useable, would be very beneficial as its use leads to a better yield per acre and a decrease in labour costs.

The characteristics of flue-cured tobacco which are changed in a detrimental manner through the application of this treatment, and the manner in which they change, include increased sugar content, decreased nicotine content, increased sugar/nicotine ratios, decreased filling value, and increased equilibrium moisture percentage.

Either an increase in the sugar content of flue-cured tobacco or a decrease in its nicotine content will effect the tobacco's taste and consequently when both these changes occur in the manner noted above the effect on taste will be quite pronounced. Also in view of a certain inter-relationship between the sugar/nicotine content any increase in the ratio of sugar to nicotine will also normally be found to adversely effect the tobacco's taste.

Of course any decrease in filling value means that for any given amount of tobacco the number of cigarettes or other manufactured tobacco products obtainable will be less than the number obtainable from the same amount of untreated tobacco. The equilibrium moisture percentage has a direct bearing on the tobacco's filling value in that an increase in equilibrium moisture percentage will result in a decrease in the tobacco's filling value or power.

For example it has been found that air-cured Burley tobacco which had been treated with maleic acid hydrazide had a lower filling value and a greater equilibrium moisture percentage than had similar tobacco in untreated form. It was also found that similarly treated cigar tobacco which was also air cured, had a greater moisture equilibrium percentage than similar non-treated tobacco and furthermore did not ferment properly under the usual fermentation conditions.

Obviously the possibilities which the maleic acid hydrazide treatment has in the tobacco growing industry makes any satisfactory, practical manner of overcoming the adverse effects which this treatment has on tobacco, extremely important.

Preferably any composition employed to counteract these adverse effects should be applicable to tobacco plants in conjunction with maleic acid hydrazide or its derivatives and should not impair in any manner the plant growth and in particular the sucker growth regulatory activity of these compounds. It is believed that until the present time no such composition was generally known.

However, it has now been found that the adverse effects on tobacco resulting from treatment with maleic acid hydrazide or its derivatives, can be decreased to a substantial and normally very acceptable extent and in some instances eliminated entirely by treating tobacco plants either simultaneously, or shortly before or shortly after treatment with a maleic acid hydrazide tobacco sucker growth inhibiting composition, with a composition containing suitable amounts of a quinone or a ring-substituted quinone, particularly benzoquinone, ring-substituted chloro derivatives of benzoquinone, nahthoquinone, and ring-substituted chloro and chloro-amino derivatives of naphthoquinone and more particularly a naphthoquinone. The quinones may be applied either in solid form as a dust in which case they will normally be mixed with an inert carrier such as chalk or other acceptable material, or in liquid form in aqueous solution in which instance a compatible surface-active wetting agent such as Tween 20 may be employed. As the normal application will consist of only about 5 to 8 pounds per acre of standing tobacco plants, of the particular quinone as commercially available, although a broader range of 2 to 10 pounds per acre is operable, it will usually be found that although quinone and at least some of its ring-substituted derivatives are only slightly soluble in water, they are sufficiently soluble to provide the required concentration in aqueous solution. However, if the particular compound is found not to be sufficiently soluble a compatible emulsifying agent can be employed.

More specifically it has been discovered that certain quinone or ring-substituted quinones counteract to a substantial extent the detrimental effects of the maleic acid hydrazide tobacco sucker growth inhibiting treatment but do not appreciably change the sucker growth regulatory activities of the maleic acid hydrazide and its derivatives. Compounds other than quinone which can be successfully used in this manner, including various ring-substituted quinones, are, for example, 2,3-dichloro-1,4-naphthoquinone, 1,4-naphthoquinone, 1,2-naphthoquinone, 2,5-dichloro - p - benzoquinone, 2,6-dichloro-p-benzoquinone and 2-amino - 3 - chloro-1,4-naphthoquinone, with the naphthoquinones being preferable in view of their more active nature and the consistent results obtained through their use in accordance with this invention.

Thus through the joint use of maleic acid hydrazide or its tobacco desuckering derivatives and certain quinone or ring-substituted quinones the beneficial effects of the maleic acid hydrazide treatment, namely an increase in tobacco yield and a reduction in labor costs are retained and the detrimental effects of this treatment are reduced to an acceptable level or in some instances substantially eliminated for all practical purposes.

The following examples are given for the purpose of illustrating the present invention and provide results of tests made on greenhouse-grown tobacco plants.

EXAMPLE I

Tobacco plants of the Hicks variety were topped and immediately therafter some were sprayed with an aqueous solution of maleic acid hydrazide, with the amount of hydrazide applied to the plants being equivalent to about 2.25 pounds per acre of standing tobacco; and other topped plants were sprayed with two different mixtures of maleic acid hydrazide and naphthoquinone. One of the mixtures was applied to one group of plants in an amount equivalent to about 2.25 pounds of maleic acid hydrazide and 2.5 pounds of naphthoquinone per acre of standing tobacco and the other mixture was applied to a different group of plants in an amount equivalent to about 2.25 pounds of maleic acid hydrazide and 7.5 pounds of naphthoquinone per acre of standing tobacco. A fourth group of plants was used as a check.

The tobacco was subsequently harvested, and flue cured and the effect of these various treatments of different plants on yield, equilibrium moisture percentage, filling power, sugar percentage, alkaloid percentage, sugar/alkaloid ratio, percentage chlorine and sucker weight are shown in Table I.

of maleic acid hydrazide, or a combination of maleic acid hydrazide and quinone or ring-substituted quinones. Spray of water was included as the check. The quinones used are shown in the attached table.

Each plant received 0.5 gm. of quinone or ring-substituted quinones which is equivalent to an amount of about 6 pounds per acre of tobacco plants and, or 0.166 gm. of maleic acid hydrazide which is equivalent to an amount of about 2¼ pounds per acre of tobacco plants. To insure good wetting of the leaves a few drops of a wetting agent, Tween 20, were added to the spray solutions. There were three plants for each treatment and the check. As the leaves ripened, only the tip leaves were harvested and flue cured.

The deleterious effects of the maleic acid hydrazide treatment: the increased equilibrium moisture and sugar content, increased sugar/nicotine ratio and the decreased filling value and nicotine content of tobacco were over-

*Table I*

|  | Check | Maleic acid hydrazide, 2¼ lbs./acre | Maleic acid hydrazide, 2¼ lbs./acre and naphthoquinone, 2.5 lbs./acre | Maleic acid hydrazide, 2¼ lbs./acre and naphthoquinone, 7.5 lbs./acre |
|---|---|---|---|---|
| Growth of suckers, gm. per plant, oven dried basis | 31.80 | 8.00 | 9.34 | 5.65 |
| Filling power (percent of check) | 100 | 83 | 91 | 92 |
| Sugar percent (total, reducing) | 32.19 | 38.64 | 34.62 | 27.76 |
| Alkaloids, total, percent | 2.19 | 2.01 | 1.98 | 2.16 |
| Sugar/alkaloid ratio | 14.69 | 19.22 | 17.48 | 12.85 |
| Yield, gm. per plant, oven dried basis | 16.40 | 35.10 | 29.10 | 27.10 |
| Chlorine, percent | 1.43 | 1.12 | 1.07 | 1.25 |

It is to be noted with respect to Table I that the relationship between the yield and sucker growth is not in some instances normal, presumably as a result of using greenhouse-grown tobacco plants.

come and rectified by additions of quinone or ring-substituted quinones as shown in Table II.

*Table II*

| No. | Treatment | Equilibrium moisture percent at 75% R.H., 75° F. | Filling value, ccm./2 gms. at 75% R.H. | Total sugars in percent | Nicotine in percent | Sugar:nicotine ratio |
|---|---|---|---|---|---|---|
| 1 | Check, water spray | 28.30 | 7.67 | 19.29 | 1.53 | 12.6:1 |
| 2 | Maleic acid hydrazide | 30.57 | 6.30 | 26.30 | 1.44 | 18.6:1 |
| 3 | 2,3-dichloro-1,4-napthoquinone and maleic acid hydrazide | 28.64 | 7.80 | 21.32 | 1.57 | 13.5:1 |
| 4 | 1,4-napthoquinone and maleic acid hydrazide | 27.83 | 7.35 | 20.96 | 1.59 | 13.1:1 |
| 5 | 1,2-napthoquinone and maleic acid hydrazide | 28.12 | 7.48 | 22.17 | 1.57 | 14.1:1 |
| 6 | Quinone (p-benzoquinone and maleic acid hydrazide | 27.96 | 7.18 | 18.91 | 1.48 | 12.7:1 |
| 7 | 2,5-dichloro-p-benzoquinone and maleic acid hydrazide | 26.85 | 7.26 | 19.45 | 1.50 | 12.9:1 |
| 8 | 2,6-dichloro-p-benzoquinone and maleic acid hydrazide | 28.01 | 7.55 | 22.21 | 1.49 | 14.9:1 |
| 9 | 2-amino-3-chloro-1,4-napthoquinone and maleic acid hydrazide | 27.72 | 7.37 | 19.67 | 1.58 | 12.4:1 |

EXAMPLE II

Greenhouse-grown tobacco plants, var. Hicks, were topped and immediately sprayed with aqueous solutions

EXAMPLE III

Greenhouse-grown tobacco plants, var. Hicks, were topped and immediately sprayed with aqueous solutions of: (a) maleic hydrazide benzoate, 0.345 gm. per plant, which is equivalent to about 2¼ pounds of maleic acid hydrazide per acre of tobacco plants; (b) 2,3-dichloro-1,4- naphthoquinone, 0.5 gm. per plant, i.e. about 6 pounds per acre of tobacco plants; (c) a mixture of maleic hydrazide benzoate and 2,3-dichloro-1,4-naphthoquinone with each compound being applied in the same amount as noted above; and (d) water (as a check). To insure good wetting of the leaves a few drops of a wetting agent, Tween 20, were added to the spray solutions. There were three plants for each treatment and the check. As the leaves ripened, only the tip leaves were harvested and flue cured.

Maleic hydrazide benzoate action was similar to that of pure maleic acid hydrazide in that it increased the tobacco equilibrium moisture content, sugar content, and sugar/nicotine ratio and decreased the filling value and nicotine content of the tobacco. The deleterious effects of maleic hydrazide benzoate were overcome by additions of 2,3-dichloro-1,4-naphthoquinone as shown in Table III.

Table III

| No. | Treatment | Equilibrium moisture percent at 75% R.H., 75° F. | Filling value, ccm./2 gms. at 75% R.H. | Total sugars in percent | Nicotine in percent | Sugar: nicotine ratio |
| --- | --- | --- | --- | --- | --- | --- |
| 1 | Check | 23.64 | 7.18 | 18.31 | 1.62 | 11.3:1 |
| 2 | Maleic hydrazide benzoate | 27.28 | 5.90 | 25.16 | 1.40 | 17.9:1 |
| 3 | Maleic hydrazide benzoate and 2,3-dichloro-1,4-napthoquinone. | 24.12 | 6.92 | 19.22 | 1.58 | 12.1:1 |

I claim:
1. An agricultural chemical composition for counteracting the adverse effects which the maleic acid hydrazide tobacco sucker growth inhibitor treatment has on tobacco comprising a first compound selected from the group consisting of benzoquinone, ring-substituted chloro derivatives of benzoquinone, naphthoquinone, and ring-substituted chloro and chloro-amino derivatives of naphthoquinone, and a second compound selected from the group consisting of maleic acid hydrazide and tobacco desuckering derivatives of maleic acid hydrazide, said quinone being present in an amount sufficient to alleviate to an acceptable extent the adverse effects of said hydrazide on the tobacco when said composition is applied to a tobacco plant with said second compound being present in an amount effective to inhibit tobacco sucker growth on the plant.

2. The composition of claim 1 wherein said first compound is 2,3-dichloro-1,4-naphthoquinone and said second compound is maleic acid hydrazide.

3. The composition of claim 1 wherein said first compound is 1,4-naphthoquinone and said second compound is maleic acid hydrazide.

4. The composition of claim 1 wherein said first compound is 1,2-naphthoquinone and said second compound is maleic acid hydrazide.

5. The composition of claim 1 wherein said first compound is 2-amino-3-chloro-1,4-naphthoquinone and said second compound is maleic acid hydrazide.

6. A method for counteracting the adverse effects which the maleic acid hydrazide tobacco sucker growth inhibitor treatment has on tobacco comprising applying a composition containing a compound selected from the group consisting of benzoquinone, ring-substituted chloro derivatives of benzoquinone, napthoquinone and ring-substituted chloro and chloro-amino derivatives of naphthoquinone together with an inert carrier to a living tobacco plant at a time during the period of time extending from shortly before to shortly after application to said plant of a compound selected from the group consisting of maleic acid hydrazide and tobacco desuckering derivatives thereof in an amount sufficient to inhibit tobacco sucker growth, said quinone being applied in an amount sufficient to alleviate to an acceptable extent the adverse effects of said hydrazide.

7. The method of claim 6 wherein said quinone is applied in an amount of from about 2 pounds to about 10 pounds per acre of tobacco plants.

8. The method of claim 6 wherein said composition is applied simultaneously with said compound selected from the group consisting of maleic acid hydrazide and derivatives thereof.

9. A method for counteracting the adverse effects which the maleic acid hydrazide tobacco sucker growth inhibitor treatment has on tobacco comprising applying napthoquinone and an inert carrier to a living tobacco plant at a time during the period of time extending from shortly before to shortly after application to said plant of a compound selected from the group consisting of maleic acid hydrazide and tobacco desuckering derivatives thereof in an amount sufficient to inhibit tobacco sucker growth, said quinone being applied in an amount sufficient to alleviate to an acceptable extent the adverse effects of said hydrazide.

10. A method for counteracting the adverse effects which the maleic acid hydrazide tobacco sucker growth inhibitor treatment has on tobacco plants comprising applying napthoquinone, an inert carrier and maleic acid hydrazide to a living tobacco plant with said naphthoquinone being applied in an amount of from about 2 to about 10 pounds per acre of tobacco plants and said hydrazide being applied in an amount sufficient to inhibit tobacco sucker growth on said plants.

11. A method for counteracting the adverse effects which the maleic acid hydrazide tobacco sucker growth inhibitor treatment has on tobacco plants comprising applying naphthoquinone, an inert carrier and maleic hydrazide benzoate to a living tobacco plant with said napthoquinone being applied in an amount of from 2 to about 10 pounds per acre of tobacco plants and said hydrazide being applied in an amount sufficient to inhibit tobacco sucker growth on said plants.

References Cited by the Examiner

UNITED STATES PATENTS

| 2,435,499 | 2/48 | Ladd | 71—2.3 X |
| 2,746,854 | 5/56 | Yowell | 71—2.3 X |
| 2,805,926 | 9/57 | Schoene et al. | 71—2.5 |

OTHER REFERENCES

Martin: "Guide to The Chemicals Used in Crop Protection," Canada Dept. of Agr., October 1955 (third edition), page 191.

JULIAN S. LEVITT, *Primary Examiner.*

GEORGE D. MITCHELL, LEWIS GOTTS,
*Examiners.*